Jan. 31, 1939.   E. F. ROSSMAN   2,145,736
SHOCK ABSORBER
Filed July 30, 1932   2 Sheets-Sheet 1

Jan. 31, 1939.  E. F. ROSSMAN  2,145,736
SHOCK ABSORBER
Filed July 30, 1932  2 Sheets-Sheet 2

Inventor
Edwin F. Rossman
By Spencer, Hardman & Utley
Attorneys

Patented Jan. 31, 1939

2,145,736

UNITED STATES PATENT OFFICE 2,145,736

SHOCK ABSORBER

Edwin F. Rossman, Dayton, Ohio, assignor, by mesne assignments, to General Motors Corporation, Detroit, Mich., a corporation of Delaware Application July 30, 1932, Serial No. 626,802

6 Claims. (Cl. 267—8)

This invention relates to improvements in shock absorbers adapted to control excessive movements of vehicle springs due to unevenness in the roadbed over which the vehicle is being operated.

It is among the objects of the present invention to provide a hydraulic shock absorber capable of automatically adjusting itself proportionately to accelerative movements of the vehicle body.

Another object of the present invention is to provide an hydraulic shock absorber which is capable also of adjusting itself automatically as the vehicle is being operated through a curved path.

A further object of the present invention is to provide an hydraulic shock absorber capable of being automatically adjusted to increase its control of the vehicle springs in response to accelerative vertical movements of the vehicle body and while the vehicle is being operated through a curved path substantially in a horizontal plane.

These objects are attained by providing the shock absorber with a fluid pressure release valve, governed by an inertia weight member which is pivotally supported by the shock absorber and which in response to either accelerative movements of the shock absorber in a vertical direction or centrifugal force resulting from the movement of the shock absorber through a curved path in a horizontal plane and will actuate said valve increasingly to restrict the fluid flow established thereby.

Further objects and advantages of the present invention will be apparent from the following description, reference being had to the accompanying drawings wherein a preferred embodiment of one form of the present invention is clearly shown.

In the drawings—

Figure 1:
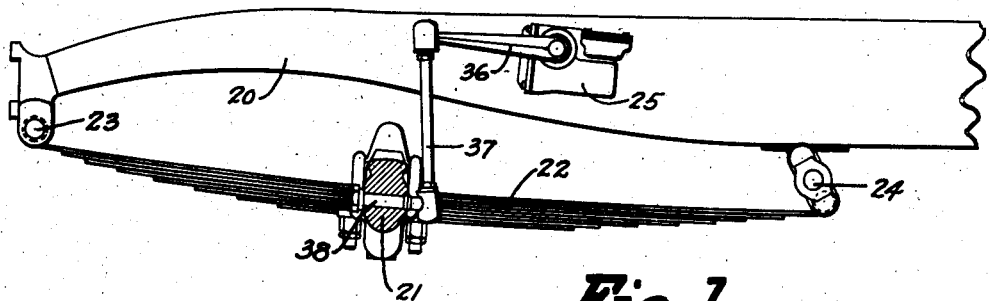
Figure 1 is a fragmentary side view of the vehicle chassis, with wheels removed, showing a shock absorber equipped with the present invention attached to the frame of the vehicle.

Referring to the drawings, the numeral 20 designates the frame of the vehicle which is supported upon the axle of the vehicle by springs 22, the ends of which are hingedly secured to the frame as at 23 and 24.

The shock absorber comprises a casing 25 providing a fluid reservoir 26 and a cylinder 27, an opening 28 in the fluid reservoir being covered by a plate 29 secured to the casing 25 by screws 30.

Within the cylinder 27 there is provided a reciprocative piston 31 having a wear-piece 32 in its head portion which is engaged by the free end 33 of a rocker lever 34. This rocker lever 34 is anchored to a rocker shaft 35 journaled transversely in the casing, one end of shaft 35 extending outside the casing and having the shock absorber operating arm 36 attached thereto. The free end of arm 36 is swivelly secured to one end of a link 37 the opposite end of said link being swivelly connected with a member 38 secured to the axle 21. From this it may be seen that movement of the axle 21 toward and away from the frame 20 will oscillate the arm 36 so that the rocker shaft 35 and its attached arm 34 will be moved clockwise and counterclockwise respectively whereby the piston 31 is actuated. The arm 34 moving counterclockwise will urge the piston 31 into the cylinder against the effect of spring 39, which is interposed between the piston and the bottom of the cylinder 27. However, when the arm 34 is rotated clockwise, due to the approaching movements of the axle 21 toward the frame 20, then the piston 31 is moved out of the cylinder 27 to follow the path of movement of the arm portion 33 by the spring 39.

Figure 2:
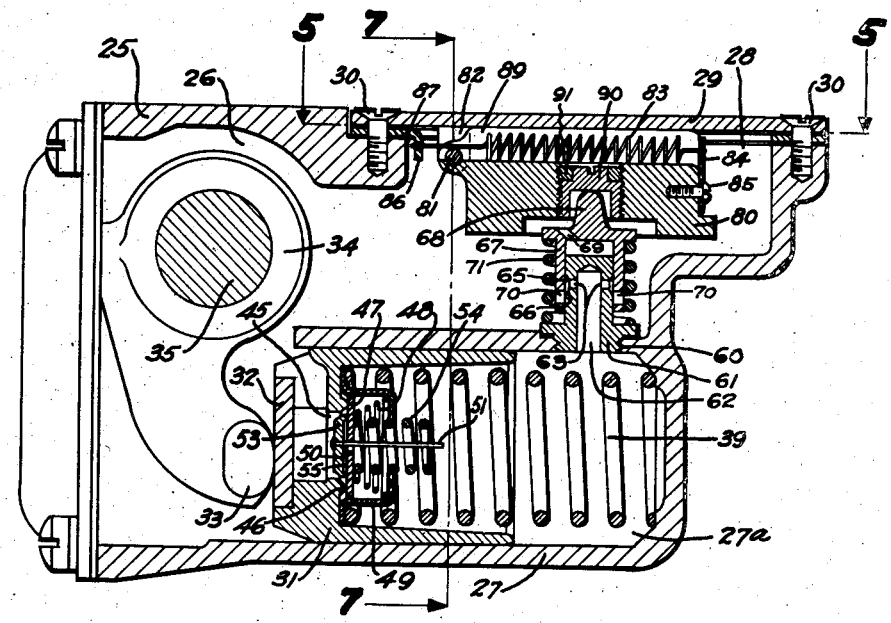
Figure 2 is a longitudinal sectional view taken through the shock absorber.
Figure 3:
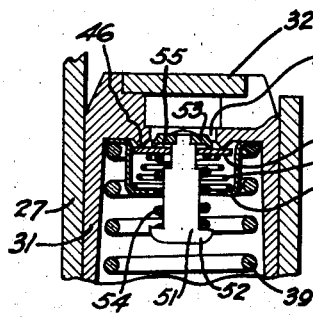
Figure 3 is a fragmentary sectional view of one fluid flow control device of the shock absorber.
Figure 4:
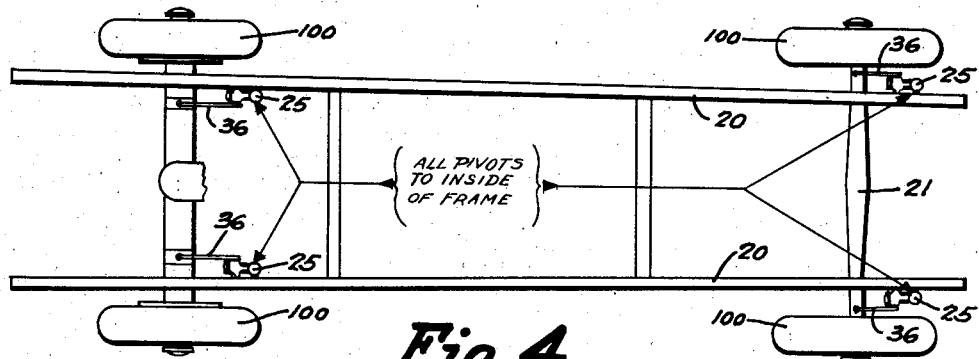
Figure 4 is a plan view of a vehicle chassis equipped with a complete set of four shock absorbers.

The piston forms a compression chamber 27a in the cylinder and has, as may be seen in Figures 2 and 3, a passage 45 through its head portion providing for the transfer of fluid between the reservoir and the said chamber. A fluid flow control mechanism is provided in the piston for controlling or regulating the fluid flow through this passage 45. As will be seen in the Figures 2 and 3, an inwardly extending annular ridge 46 provides a valve-seat about the passage 45 which is engaged by the intake valve 47 under the influence of spring 48 which is seated within the valve-cage 49. Valve-cage 49 is maintained against the inner surface of the piston head by spring 39. A central opening 50 is provided in the intake valve 47 for receiving a portion of the valve-stem 51. This valve-stem has a head 52 at its one end, while the opposite end, which extends through and beyond the intake valve 47, has a button-valve 53 attached thereto, said button-valve being concave, the peripheral edge of which rests upon the outer surface of the intake-valve 47. A spring 54, surrounding the stem 51 and interposed between the intake valve 47 and the head 52 of the stem, urges the stem so that its button-valve 53 is maintained upon the intake valve as mentioned. The opening 50 in the intake valve is of a different shape than the portion of the stem 51 extending therethrough so that there is provided a passage between the wall of the stem 51 and the wall of the opening 50 providing communication between the compression chamber formed between the piston and the end wall of piston 27 and the chamber 55 formed between the intake valve 47 and the concave button valve 53.

An interiorly threaded port 60 is provided in the wall of the cylinder adjacent the closed end of said cylinder, this port providing communication between the compression chamber 27a in cylinder 27 and the reservoir 26. In this port there is threaded one end of a tubular valve 61, the tubular valve having a central passage 62 closed at the outer end. Side openings 63 are provided in the wall of the valve adjacent the closed end of the central passage 62 therein, these side openings terminating in an annular groove 65 in the outer surface of valve 61, said annular groove having its lower edge sloping as at 66. Slidably fitting over valve 61 is the member 67 of the valve, the upper end of which is closed and is provided with a hump 68. The space between the closed end of valve 61 and the closed end of the valve portion 67 is vented by an opening 69. Side openings 70 in the member 67 are normally in communication with the lower end of the annular groove 65 as shown in Figure 2. Valve member 67 is held in normal position by a spring 71 interposed between a flange on the valve member 61 and a flange on the valve member 67, this spring 71 urging the valve into engagement with the weight member 80.

The weight member 80 is pivotally supported upon a pin 81 at a point above the horizontal center of the mass of the weight 80, this pin 81 being in turn supported by two oppositely disposed adjacent ears 82 depending from the cover plate 29. These ears 82 are so positioned that in whatever position cover plate 29 is attached to the casing 25, the center of weight 80 will be substantially in coaxial alignment with the center of the valve member 67.

Figures 7, 8:
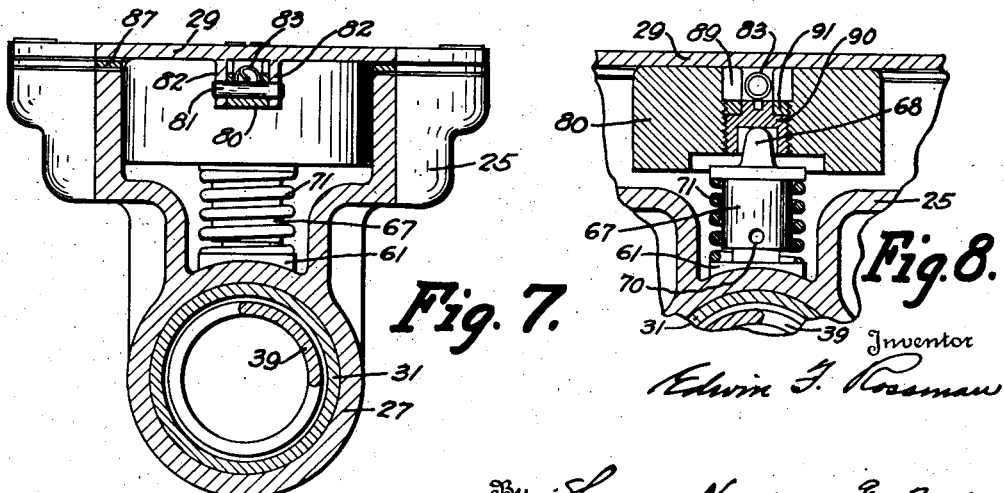
Figure 7 is a cross sectional view taken substantially along the line 7—7 of Figure 2.
Figure 8 is a fragmentary view showing the inertia weight governed fluid flow control device.

As shown in Figures 2, 7 and 8, the weight member 80 has a groove 89 provided therein forming a receptacle for the spring 83, one end of which is anchored to a plate 84 attached to one side of the weight member 80 by screw 85, the opposite end of said spring 83 being anchored to a depending ear 86 formed on a ring-plate 87 which is mounted on the casing 25 between the plate 29 and said casing. Normally spring 83 urges the weight 80 so that its upper edge or surface is maintained in engagement with the interior surface of the cover plate 29. In this position a recessed screw plug 90, carried centrally of the weight 80, forms the abutment for the hump 68 of the valve member 67 and thus the spring 71, urging the valve member 67 against the screw plug 90, maintains said valve member 67 so that its side openings 70 are in proper normal alignment with the annular groove 65 of the valve member 61. A lock nut 91 maintains the plug 90 in properly adjusted position within the weight 80.

Figures 5, 6:
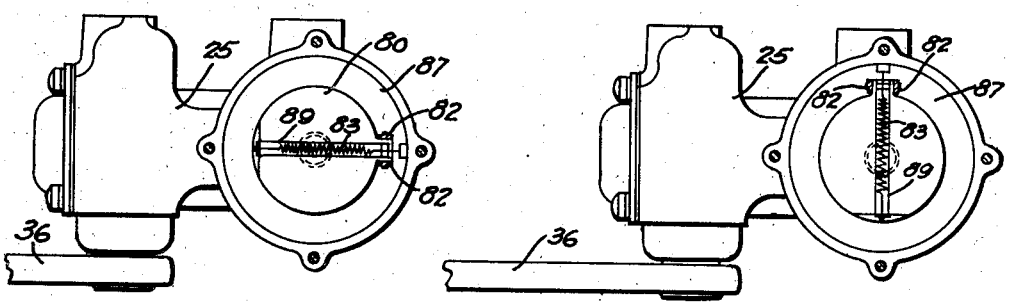
Figure 5 is a plan view of the shock absorber at reduced scale, taken substantially along the line 5—5 of Figure 2, the inertia weight, however, being shown pivotally supported at a point substantially 180° from that shown in the Figure 2.
Figure 6 is a view similar to Figure 5, showing the shock absorber inertia weight of the shock absorber pivoted at a point 90° from that shown in the Figure 5.

The ring-shaped plate 87, which is clamped against the casing 25 by the cover plate 29, may be secured in four different positions upon the shock absorber, more specifically each adjacent position being 90° apart. Similarly cover plate 29 is attachable to the casing in the same four positions. When the weight supporting cover plate 29 and the ring plate 87 to which the spring 83 is anchored are attached to the shock absorber as shown in either Figure 2 or 5, these positions showing the weight pivoted in two different positions 180° apart, then the weight member 80 is responsive only to vertical accelerative movements of the vehicle frame 20 to adjust the shock absorber. However, when the weight supporting plate 29 and its associate plate 27 are secured to the shock absorber casing 25 in position at 90° from the aforementioned position, or in a position as shown in Figure 6, then the shock absorber adjusting weight 80 is responsive not only to the vertical accelerative movements of the frame of the vehicle 20, but also to centrifugal force resulting from the operation of the vehicle through a curved path in a horizontal plane such as around a bend or corner in the roadway. It may readily be seen that, due to the pivotal support 81 of the weight 80 being above the mass, movement of the shock absorber casing in a curved path, deviation from a straight line will thrust weight 80 downwardly or move it clockwise as regards Figure 2, and thus operate valve member 67 to increase the shock absorber resistance.

The operation of the shock absorber will now be described detailedly:

Supposing the road wheels 100 of the vehicle strike an obstruction in the roadway, axle 21 will be thrust upwardly toward the frame 20, compressing springs 22 and resulting in an upward movement of the arm 36 due to the link connection 37 between said arm and axle. The shaft 35 is now rotated clockwise and similarly rocker arm 34 and thus the piston 31 is urged out of the cylinder by the spring 39. Under these circumstances fluid exerting a pressure through passage 45 will move the valve assembly, consisting of the valve 47 and the other valve 53 supported thereon, away from the seat 46 to establish a substantially free flow of fluid from the reservoir through passage 45 into the compression chamber of the cylinder 27.

The limit of the upward movement of the axle due to the striking of this obstruction, having been reached, springs 22 will rebound to normal load position and thus a reversal of movement of the shock absorber obtains. Now the piston will be urged into the cylinder by counterclockwise movement of the rocker arm 34 and consequently a pressure will be exerted upon the fluid within said cylinder. If the upward movement of the vehicle frame 20, which supports the vehicle body, is not of sufficient acceleration, weight 80 will not be moved from its engagement with the plate 89 and consequently the orifice normally provided between the side openings 70 in the valve member 67 and the sloping surface 66 of the annular groove 65 in valve member 67 will be substantially maintained and thus the fluid, under pressure in the chamber 27, will flow through central passage 62 of the valve member 61, side openings 63 into the groove 65 and out of holes 70 into the reservoir under normal restriction. This restriction to the fluid flow will provide normal resistance to the inward movement of the piston and consequently the expansion or rebounding movement of the vehicle springs 22 will be resisted. If the rebounding movement of the vehicle springs 22 is excessive, however, and the aforementioned orifices at the openings 70 can not properly relieve the fluid pressure, then, this excessive pressure will operate the valve 53 against the effect of spring 54 to move said valve out of engagement with the intake valve 47 and thereby permit fluid to flow from the chamber 27 through the opening 50 in the disc or intake valve 47, into the chamber 55 and from said chamber through the annular orifice between the peripheral edge of the button-valve 53 and the intake valve 47, thence through the passage 45 into the fluid reservoir. The extent of movement of the valve 53 from the valve 47 is of course governed by the degree of fluid pressure within the chamber 27.

If, however, the upward movement of the vehicle frame 20, due to the rebounding movement of the vehicle springs is of predetermined acceleration then weight 80 will move relative to the casing 25 which, as has been mentioned heretofore, is attached to the frame 20 and moves therewith, this relative movement of the weight 80 urging valve member 67 downwardly toward the valve member 61 so as to decrease the orifice provided between the edge of opening 70 and the sloping edge 66 of the annular groove 65, so that restriction to the flow through this orifice is substantially increased and consequently the shock absorber resistance to the upward movement of the body carrying frame 20 is proportionately increased.

If, the groove 89 in the weight 80 is in substantial alignment with the axis of cylinder 27, or if said groove 89 is substantially parallel to the vehicle frame, then the weight 80 is responsive to accelerative movements of the frame 20 upwardly to effect adjustment of the valve 67. However, if the pivot of the weight member 80 is shifted 90° in either direction or more specifically if the slot or groove 89 is transverse to the frame 20 of the vehicle, the pivot point of the pivot member 81 being always more adjacent the center of the vehicle frame, then as the vehicle is operated around a curved path in the roadway and substantially in a horizontal plane, resulting centrifugal force will effect a downward or clockwise movement of the weight members 80 of the shock absorbers on the side of the car closest the center of the curved path of the vehicle (Figure 2) resulting in a similar adjustment of the valve member 67 to effect increased restriction to the fluid flow. It is common knowledge that a vehicle when rounding a curve at comparatively high speed, will have a tendency to tip outward, and therefore it is desirable to lock the shock absorbers on one side of the vehicle, preferably the inside or lifting side, the side of the vehicle adjacent the inside of the curve and for this reason the pivotal points of the weight members 80 are placed more adjacent the middle of the vehicle so that, due to the centrifugal force caused by the vehicle rounding a bend in one direction or the other weight members 80 must move downwardly. This result is obtained by having the pivotal points of the weight members above the center of the mass as shown in Figures 2, 7 and 8.

From the aforegoing it may be seen that applicant has provided a shock absorber which may be assembled either to be automatically adjustable in response to accelerative movements of the vehicle frame in an upward direction or to centrifugal force resulting from the operation of the vehicle around a bend substantially in a horizontal plane, or both as a result of said accelerative movements and centrifugal force. The shock absorber is designed so that it is necessary merely to remove four screws and shift or turn the cover plate and its associate plate 87, 90° in either direction to effect such desired control.

While the form of embodiment of the present invention as herein disclosed constitutes a preferred form, it is to be understood that other forms might be adopted, all coming within the scope of the claims which follow.

What is claimed is as follows:

1. An hydraulic shock absorber for a vehicle having a sprung and insprung mass comprising in combination, a casing attached to the sprung mass and providing a fluid reservoir and a cylinder; a piston reciprocable in said cylinder, connected to the unsprung mass, and forming a compression chamber in the cylinder; a valve adapted to establish a restricted flow of fluid from said compression chamber in response to the movement of the piston in one direction; an inertia weight adapted to adjust said valve to vary its restriction to the fluid flow; and a pivot pin longitudinally of the sprung mass and above the center of the weight mass supporting said inertia weight in the shock absorber casing whereby said weight will be responsive to both, accelerative movements of the casing in a vertical direction and centrifugal force resulting from the movement of the vehicle in a curved path in a substantially horizontal plane, for adjusting the valve.

2. An hydraulic shock absorber adapted to control the approaching and separating movements of the frame and axle of a vehicle comprising, in combination, means for circulating fluid; control means for restricting said fluid circulation; and an inertia weight pivotally carried by the shock absorber and engaging said last-mentioned means, said weight being adapted in response to both, accelerations in the movement of the vehicle frame away from the axle and to centrifugal force resulting from the operation of the vehicle along a curved path in a horizontal plane, to adjust the control means increasedly to restrict the circulation of the fluid.

3. An hydraulic shock absorber comprising in combination, a casing providing a fluid reservoir and a cylinder; a piston in said cylinder forming a compression chamber therein; two ducts providing communication between the reservoir and compression chamber; a normally closed, pressure operated valve in one of said ducts; a normally open valve in the other duct; and an inertia weight member adapted, in response to centrifugal force resulting from the movement of the shock absorber in a curved path and in response to accelerative movements of the shock absorber in another direction, to actuate said last-mentioned valve increasedly to restrict its fluid flow.

4. In an hydraulic shock absorber adapted to be attached to one of the substantially parallel side members of a vehicle frame, the combination with a fluid flow control device; an inertia weight for adjusting said device to vary its control of the fluid flow; means providing a pivot pin for supporting the inertia weight at one side of its horizontal center; a spring yieldably urging said weight against said means; and means for securing the aforementioned means upon the shock absorber in one position in which the pivot pin is substantially parallel with the vehicle frame members and in another position in which the axis of the said pin is substantially at right angles to said members.

5. In an hydraulic shock absorber adapted to be attached to one of the side members of a vehicle frame, the combination with a fluid flow control device; an inertia weight for adjusting said device to vary its control of the fluid flow; a plate having means supporting a pin which pivotally supports the weight at one side of its horizontal center, said plate being attachable to the shock absorber in one position in which the axis of the pin is substantially parallel with the side member of the vehicle frame and in another position in which the axis of said pin is substantially at right angles to said frame member; and a spring yieldably urging the weight into normal engagement with said plate.

6. In an hydraulic shock absorber adapted to be attached to one of the side members of a vehicle frame, the combination with a fluid flow control device; an inertia weight for adjusting said device to vary its control of the fluid flow; a plate carrying a pin which provides a pivotal support for the weight on the side of its horizontal center more adjacent the plate, said plate being attachable to the shock absorber in one position in which the axis of the pin is substantially parallel to the side member of the frame and in another position in which the axis of the pin is substantially at right angles to said frame member; and a spring yieldably urging the weight away from the fluid flow control device and normally against the plate.

EDWIN F. ROSSMAN.